United States Patent [19]

Persson

[11] 4,269,420
[45] May 26, 1981

[54] SEAL

[75] Inventor: Stig Persson, Katrineholm, Sweden

[73] Assignee: Aktiebolaget SKF, Goteborg, Sweden

[21] Appl. No.: 119,509

[22] Filed: Feb. 7, 1980

[30] Foreign Application Priority Data

Mar. 30, 1979 [SE] Sweden .............................. 7902838

[51] Int. Cl.³ ............................................. F16J 15/48
[52] U.S. Cl. .................................................. 277/53
[58] Field of Search .......................... 277/152, 53, 67

[56] References Cited

U.S. PATENT DOCUMENTS

| | | | |
|---|---|---|---|
| 2,054,580 | 9/1936 | Delaval-Crow | 277/67 |
| 3,013,824 | 12/1961 | Wilson | 277/53 |
| 3,917,150 | 11/1975 | Ferguson et al. | 277/53 |

Primary Examiner—Robert I. Smith
Attorney, Agent, or Firm—Eugene E. Renz, Jr.

[57] ABSTRACT

The invention relates to a seal for a gap between a rotatable shaft (3) and an element (1) surrounding the shaft. The seal comprises a lid (5) provided on the surrounding element and showing an annular groove (6) which is open towards the envelope surface of the shaft, and a resilient ring (7) provided on the shaft, which ring is enclosed by the groove. One end surface (8) of the ring is covered by a flock of fibres (10). The free ends of the fibres contact one of the groove walls. The other end surface (9) of the ring directly contacts the other groove wall.

6 Claims, 2 Drawing Figures

SEAL

BACKGROUND AND SUMMARY OF THE INVENTION

The seal is mainly intended for a shaft opening in a bearing housing or the like. The purpose of such a seal is to prevent impurities from entering the sealed space and to prevent lubricants from leaving it. A seal should also cause the least possible friction losses, take up the least possible space, be easy to mount, and be possible to produce at a low cost.

A number of different seal types are earlier known. In order to obtain the desired operational properties they are generally complicated and thus expensive to manufacture and difficult to handle.

The object of the present invention is to provide a seal which has good operational properties and also can be produced simply and inexpensively and which is easy to handle.

This can be achieved according to the invention by providing the seal with the characterizing features appearing in the appended claim 1.

A seal according to the invention can be suitably used in applications where a shaft is allowed to be skewed in the opening in which the seal is arranged.

BRIEF DESCRIPTION OF THE DRAWING

The following is a closer description of the invention with reference to the accompanying drawing, in which.

DESCRIPTION OF THE PREFERRED EMBODIMENTS

Figure 1:
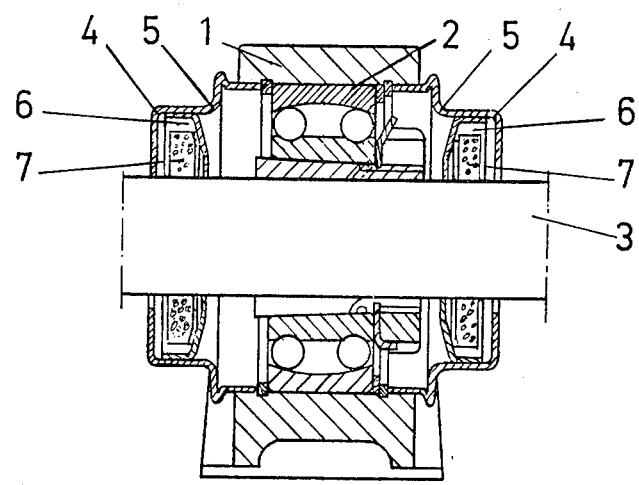
FIG. 1 shows a longitudinal section of a bearing housing with a bearing and a shaft passing through. The housing is provided with a seal according to one embodiment of the invention.
Figure 2:
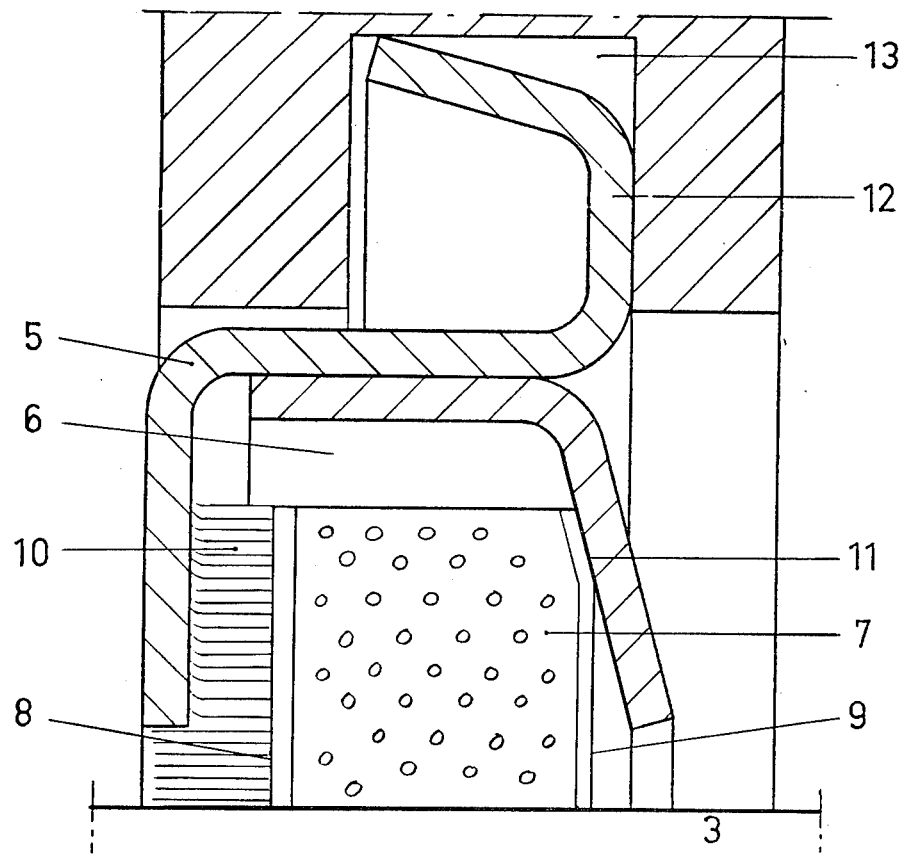
FIG. 2 shows a longitudinal section in a larger scale of a portion of the seal according to a slightly different embodiment of the invention.

FIG. 1 shows a bearing housing 1 provided with a spherical ball bearing 2. A shaft 3 passes through the housing and is rotatably suspended by the bearing 2 in the housing 1. Seals 4 are arranged at the ends of the housing. Each seal comprises an annular member in the shape of a lid 5 which is attached to the housing. The lid is provided with an opening for the shaft and has an annular groove 6 open towards the envelope surface of the shaft. The seal also comprises a member in the shape of a resilient sealing ring 7, which is arranged on the surface of and rotating with the shaft and surrounded by the groove 6. The ring 7 has two preferably plane and parallel end surfaces 8, 9 which is best shown in FIG. 2. Preferably the ring is made of a foamed plastic material, e.g. poly-urethane and the areas closest to the side surfaces consist of a skin of homogeneous material, whereas the central portion is porous. One side surface 8 is provided with a flock of fibres 10 arranged mainly perpendicular to the surface, the free ends of the fibres contacting one of the walls in the annular groove. The fibres are suitably of poly-amide type and attached to the surface of the ring 7 by an electrostatic method, an adhesive compound being applied to the surface. The other side surface 9 contacts the other of the walls in the groove with a radially outer portion 11. The porous portion suitably extends to the peripheral surface of the ring.

In order to improve the sealing and friction properties, the porous portion is suitably provided with a lubricant, e.g. oil. The lubricant is pressed by the centrifugal force partly into the groove 6 where it lubricates the contact between the ring 7 and the wall of the groove. The ring 7 is deformed at 11 because of its contact pressure against the wall. The outer portion of the flock 10 is also filled by a lubricant, which prevents ingress of impurities into the housing. The portion of the flock which is situated close to the shaft has the function of a brush seal and flinger.

In order to establish good sealing properties between the end surface 9 of the ring 7 and the wall of the groove 6, the groove wall against which the non-fibrous end surface 9 of the resilient ring is pressed is designed so that the groove 6 narrows towards the bottom. The sealing ring 7 thereby acts as a lip seal against the wall of the groove 6. Preferably the wall has the shape of a truncated cone, but it may also have another shape, e.g. the shape of a spherical zone.

A seal according to the invention can be easily designed so that it keeps its sealing function even if the shaft is skewed or tilted or displaced radially. This is an advantage if for example the seal is used in a housing in which is arranged a self-aligning bearing supporting a shaft. The resilient sealing ring 7 is thereby mounted axially displaceable on the shaft 3, the opening for the shaft in the lid 5 is made larger than the bore of the ring 7 and the sealing elements are designed so that there is a radial play between the bottom of the groove 6 and the envelope surface of the ring 7. Thereby the shaft is free from contacting the lid 5 when skewed or tilted, and the fibres 10 on the ring 7 are compressed at one side of the shaft and unloaded at the other side without losing their contact against the wall. Also the non-fibrous end surface of the sealing ring is unloaded and compressed, respectively, at the respective sides of the shaft. During operation the ring adjusts itself automatically at the position on the shaft where the force equilibrium on the ring with the least possible force exists. The friction of the ring against the shaft 3 is so great and the friction against the lid 5 so small, however, that the ring always rotates with the shaft.

A seal according to the invention can be designed in many different ways in order to be adapted to different applications and functional demands. For example, the connection of the lid 5 to the wall surrounding the shaft 3 can be arranged according to FIG. 1, wherein a cylindrical portion of the lid is inserted in a corresponding portion of the opening of the wall, or according to FIG. 2 wherein a radial flange 12 or the like is arranged in a groove 13 in the opening wall. It is favorable from the manufacturing point of view that the ring 7 has end surfaces which are plane and parallel in unloaded state. Thereby rings can be made by e.g. stamping from plane sheets. However, from a function point of view it may be suitable that the ring be shaped differently, for example by being provided with a lip for engaging a wall in the groove 6 or by being provided with a special surface for engaging the shaft 3.

I claim:

1. A seal for a gap between a rotatable shaft (3) or the like and an element (1) surrounding the shaft, the seal comprising an annular first member (5) mounted on said element, and surrounding the shaft, said first member having an opening of greater diameter than the shaft to allow for skewing of the shaft, said first member having two spaced side walls forming an annular groove (6)

open towards the envelope surface of the shaft; and a second member (7) rotatable with the shaft and enclosed by said annular groove and radially spaced from the surface comprising the closed end of said annular groove, said second member being constituted by a resilient ring with opposite axial end surfaces (8, 9) one of which being provided with a plurality of discrete fibers uniformly arranged mainly perpendicular to one of said axial surfaces, the free ends of the fibers sealingly contacting and flexing against one of the side walls in said annular groove, the other one of said axial end surfaces directly and sealingly contacting the other one of the side walls of said annular groove thus providing tight contact even when the shaft is skewed.

2. A seal according to claim 1, characterized by that the resilient ring (7) comprises a lubricant absorbing portion containing a lubricant and being partly limited by an outer surface of the ring.

3. A seal according to claim 1, characterized by that the wall in said groove (6) which is contacted by the non-fibrous end surface of the resilient ring has such a shape that the groove (6) is narrowing towards the bottom.

4. A seal according to claim 3, characterized by that the shape is conical.

5. A seal according to claim 1, characterized by that the resilient ring (7) is axially movable along the shaft (3).

6. A seal according to claim 1, characterized by that the end surfaces of the resilient ring (7) are mainly plane and parallel in an unloaded state.

* * * * *